United States Patent [19]
Prellwitz

[11] Patent Number: 6,164,197
[45] Date of Patent: Dec. 26, 2000

[54] KNOTTER FOR BALLING APPARATUS

[75] Inventor: Hubert Prellwitz, Neustadt, Germany

[73] Assignee: Case Harvesting Systems GmbH, Neustadt, Germany

[21] Appl. No.: 09/299,223

[22] Filed: Apr. 23, 1999

[30] Foreign Application Priority Data

Apr. 30, 1998 [DE] Germany .......................... 198 19 595

[51] Int. Cl.[7] .................................................. B65B 13/26
[52] U.S. Cl. .................................. 100/20; 289/13; 100/22
[58] Field of Search .......................... 100/20–23, 33 R; 289/13, 14

[56] References Cited

U.S. PATENT DOCUMENTS 3,418,015 12/1968 Nolt .......................................... 289/13
3,448,681 6/1969 Nolt .......................................... 100/22

FOREIGN PATENT DOCUMENTS 90 15 883 6/1991 Germany .

OTHER PUBLICATIONS

"Hochdrucksammelpresse" (Bedienungsanleitung), Typen K 441 und 441/1, Veb Fortschritt–Erntebergungsmaschinen, Dec. 1962, Neutadt, Sachsen, 12 pages.

"Hochdrucksammelpresse" (Ersatzteilkatalog) Typen K 441–441/1, Feb. 1963, Veb Forschritt–Erntebergungsmaschinen, Neustadt, Sachsen, 5 pages.

Primary Examiner—Stephen F. Gerrity
Attorney, Agent, or Firm—Herbert Dubno; Andrew Wilford

[57] ABSTRACT

A baler has a frame, a shaft extending on the frame along and rotatable about an axis, and a knotter having a sleeve-like hub rotationally fixed to the shaft and of a predetermined outer diameter. A support journaled on the hub is fixed to the frame and carries movable knotting parts. A rim ring surrounding the axis is formed of a main C-shaped part having arms spaced apart by a distance greater than the hub outer diameter and a bridge part between the arms and closing the main part. The rim ring also has formations engageable with the parts for actuating same. Fasteners releasably fix the rim ring on the hub.

6 Claims, 6 Drawing Sheets

KNOTTER FOR BALLING APPARATUS

FIELD OF THE INVENTION

The present invention relates to a baling apparatus. More particularly this invention concerns a knotter for a baler.

BACKGROUND OF THE INVENTION

A standard baler has a system for compacting crushable material, for instance cut crop or waste paper, into a generally parallepipedal mass that is moved in the machine along a square-section passage. A plurality of knotters such as described in German utility model 90 15 883 published Nov. 22, 1990 and in U.S. Pat. Nos. 4,506,920 and 4,511,165 are provided in a row in the passage and act along with string- or wire-feeding devices to secure respective loops of string or wire around the bale which is then ejected from the baler. Normally four to six such loops are used to make the bale coherent enough to handle.

The knotters are all mounted coaxially on a common shaft. Each knotter comprises a drive disk having a hub fixed to the shaft and a partially toothed rim that engages one or more gears carried on a knotter support that is journaled on the hub of the respective disk and also fixed against rotation on the frame of the baler. Thus as the shaft rotates the teeth of its disk engage and disengage the gears of the knotter mechanism carried on the support and effect the various well known movements of this mechanism to catch and tie the ends of the strand looped around the bale.

The knotters are subject to considerable wear since they function in a particle-filled environment and are often working with a metallic or synthetic-resin tie strand that also subjects its parts to considerable wear. It is nonetheless an extremely onerous job to uncouple one end of the drive shaft and slip off one or more knotters so they can be worked on. Thus it is standard to make the knotter support in a pair of halves that are bolted together around the hub of the respective main drive disk. The support can therefore be separated into two halves by withdrawing some bolts to separate it from its drive disk and replace its parts and/or service it.

As the disk itself is also subject to wear, the Cormick system used in Fortschritt balers sold under models K441 and K441/1 use a drive disk formed with diametral grooves allowing it to be split into two parts and removed if necessary. A replacement disk is similarly split in half and secured together by screws so that the entire shaft does not have to be pulled to service a single knotter. Since, however, such a disk is used to transmit considerable torque in stop-and-go movements and must fit very accurately with the mechanism of the knotter, such reassembled disks often are unsatisfactory. Without a perfect fit, the knotter can be counted on to wear prematurely and fail rapidly.

OBJECTS OF THE INVENTION

It is therefore an object of the present invention to provide an improved knotter for a baler.

Another object is the provision of such an improved knotter for a baler which overcomes the above-given disadvantages, that is which allows the disk to be serviced and renewed easily while still ensuring that any replacement disk is a perfect fit.

SUMMARY OF THE INVENTION

A baler has a frame, a shaft extending on the frame along and rotatable about an axis, and a knotter having a sleeve-like hub rotationally fixed to the shaft and of a predetermined outer diameter. A support journaled on the hub is fixed to the frame and carries movable knotting parts. A rim ring surrounding the axis is formed of a main C-shaped part having arms spaced apart by a distance greater than the hub outer diameter and a bridge part between the arms and closing the main part. The rim ring also has formations engageable with the parts for actuating same. Fasteners releasably fix the rim ring on the hub.

Thus with this system if the wear-prone rim ring, which is normally formed with gear teeth and cam edges, becomes worn, it is possible to take off the bridge part and remove it from the hub without disassembling the entire knotting assembly. The ring itself can be replaced easily, while the hub, which carries the support and which transmits considerable torque to the rim ring, does not have to be touched. Since the hub itself is not subject to considerable wear, it can be counted on to have a service life many times that of the other parts of the knotter.

According to the invention the formations of the rim ring are all formed on the main C-shaped part. Thus all the bridge part does is ensure structural stability to the rim ring and also prevent it from forming an offcenter weight.

As mentioned above the formations include a cam edge and teeth. The parts in accordance with the invention including gears engageable with the formations. These gears operate the knotting arm and strand catcher described in the above-cited US patents.

The hub is formed with a radially projecting flange to which the rim ring is attached by the fasteners which according to the invention are screws. Two of these screws engage through both the main part and the bridge part. Further screws may secure the bridge part only to the main part.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
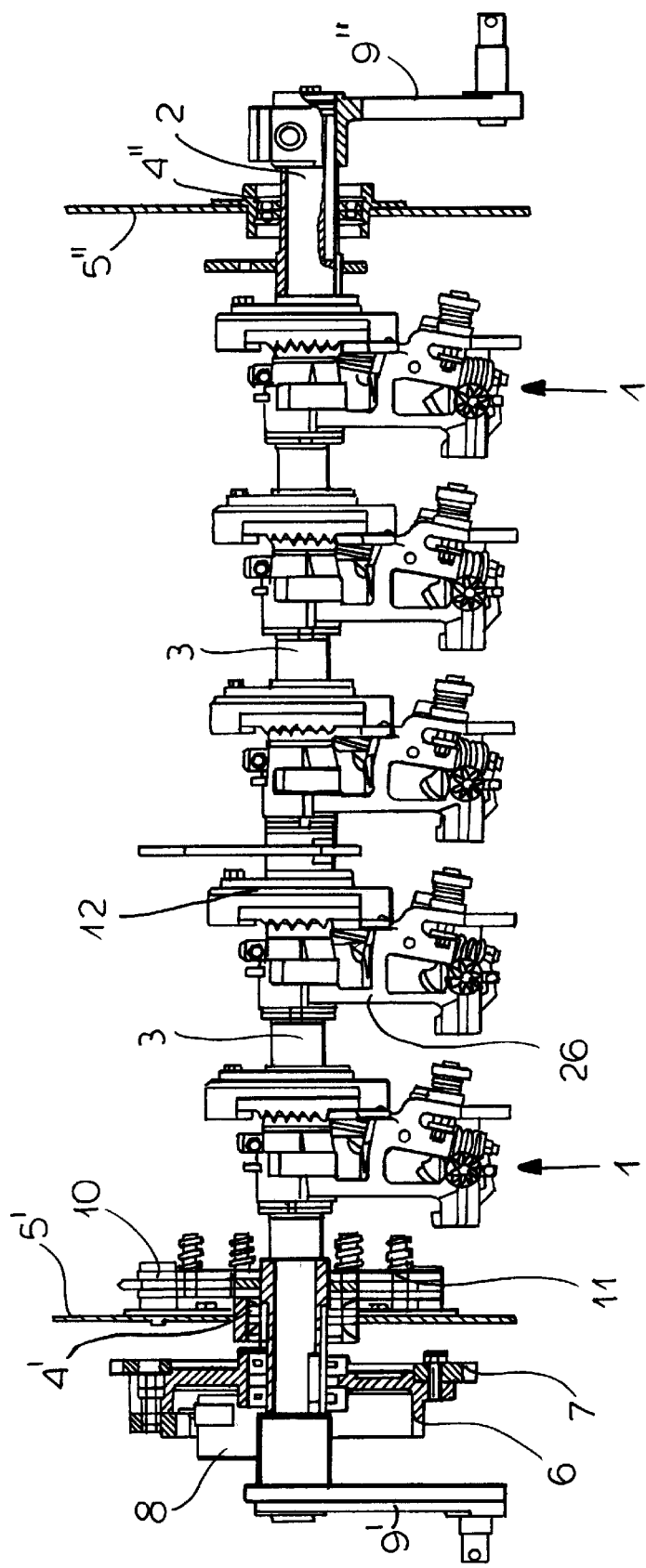
FIG. 1 is a front view of a baler with five knotters.

As seen in FIG. 1 an apparatus for making square bales has a five knotters 1 of the type described in the above-cited US patents mounted on a common shaft 2 extending along an axis A in bearings 4' and 4" between side plates 5' and 5" of a frame 33 (FIG. 3) of the baler. Spacer sleeves 3 axially separate the knotters 1. The shaft 2 is rotated about the axis A by an unillustrated drive having a drum 6 on an input wheel 7 itself connected via a single-revolution clutch 8 to the shaft 2 so as to give same the periodic rotation needed to operate the knotters 1. The left side wall 5' carries a brake 10 acting on a brake disk 11 of the shaft 2. This structure is generally standard.

Figure 2:
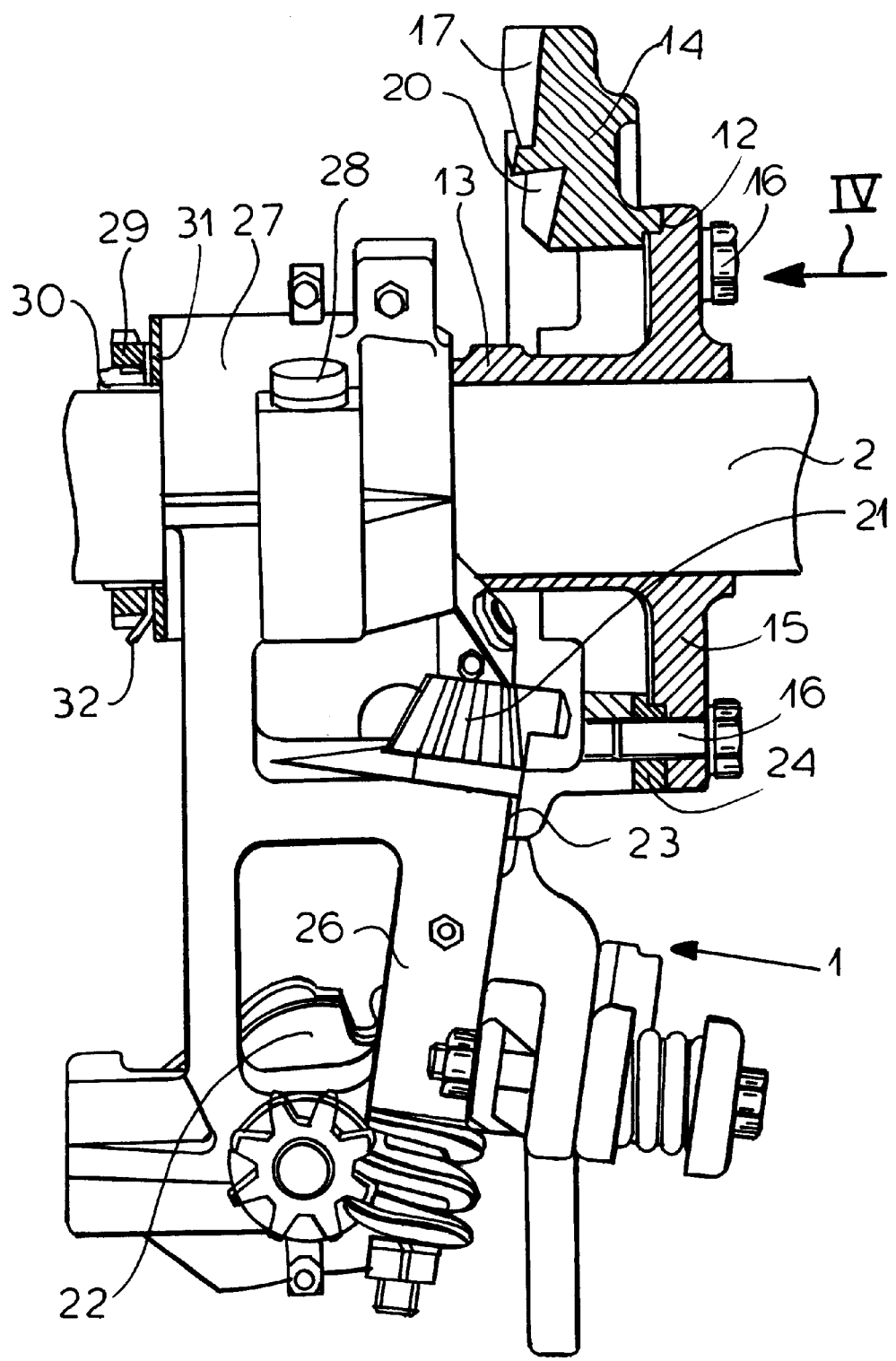
FIGS. 2 and 3 are front and back partly sectional views of one of the knotters according to the invention.
Figure 3:
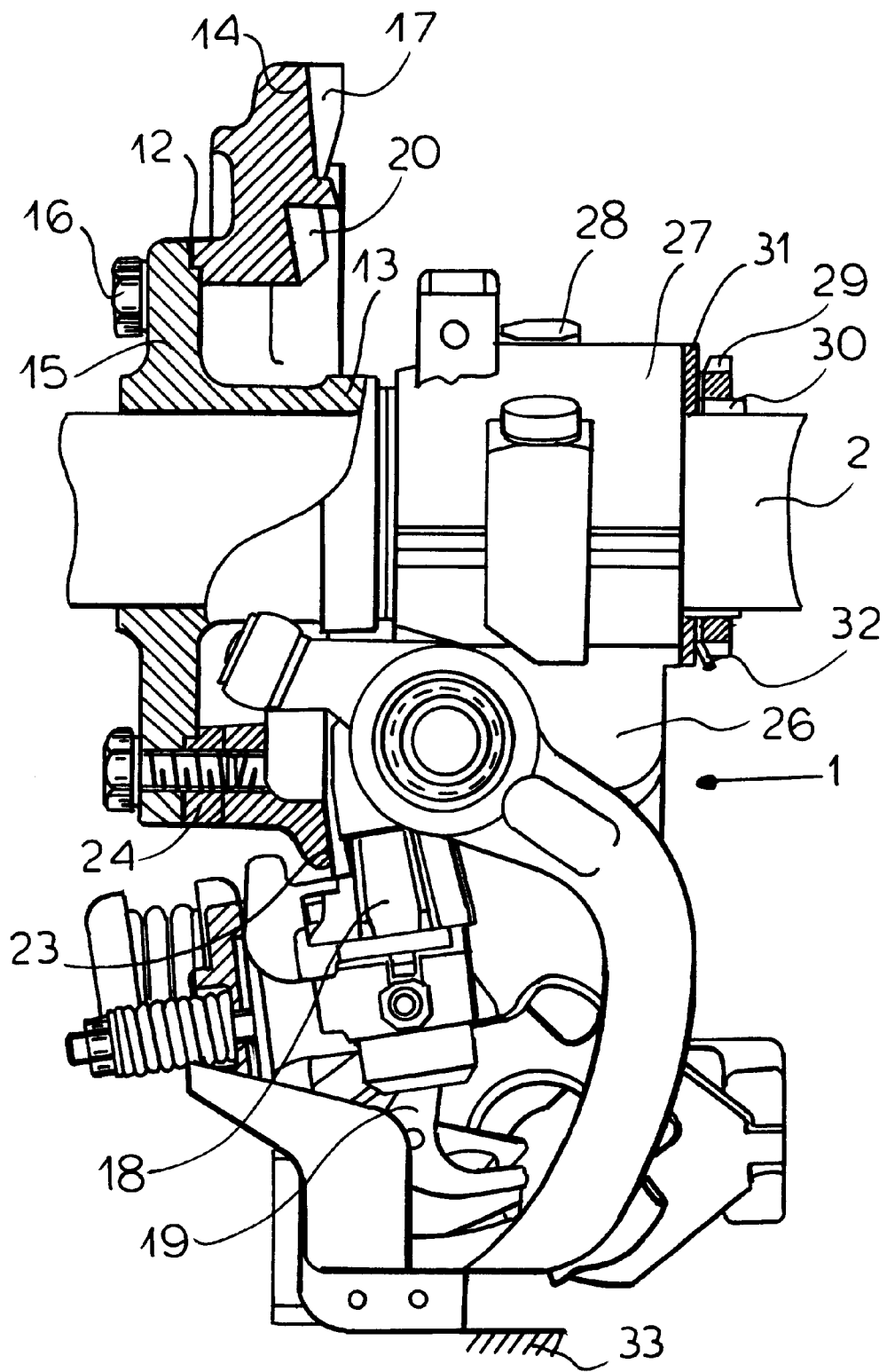
Figure 4:
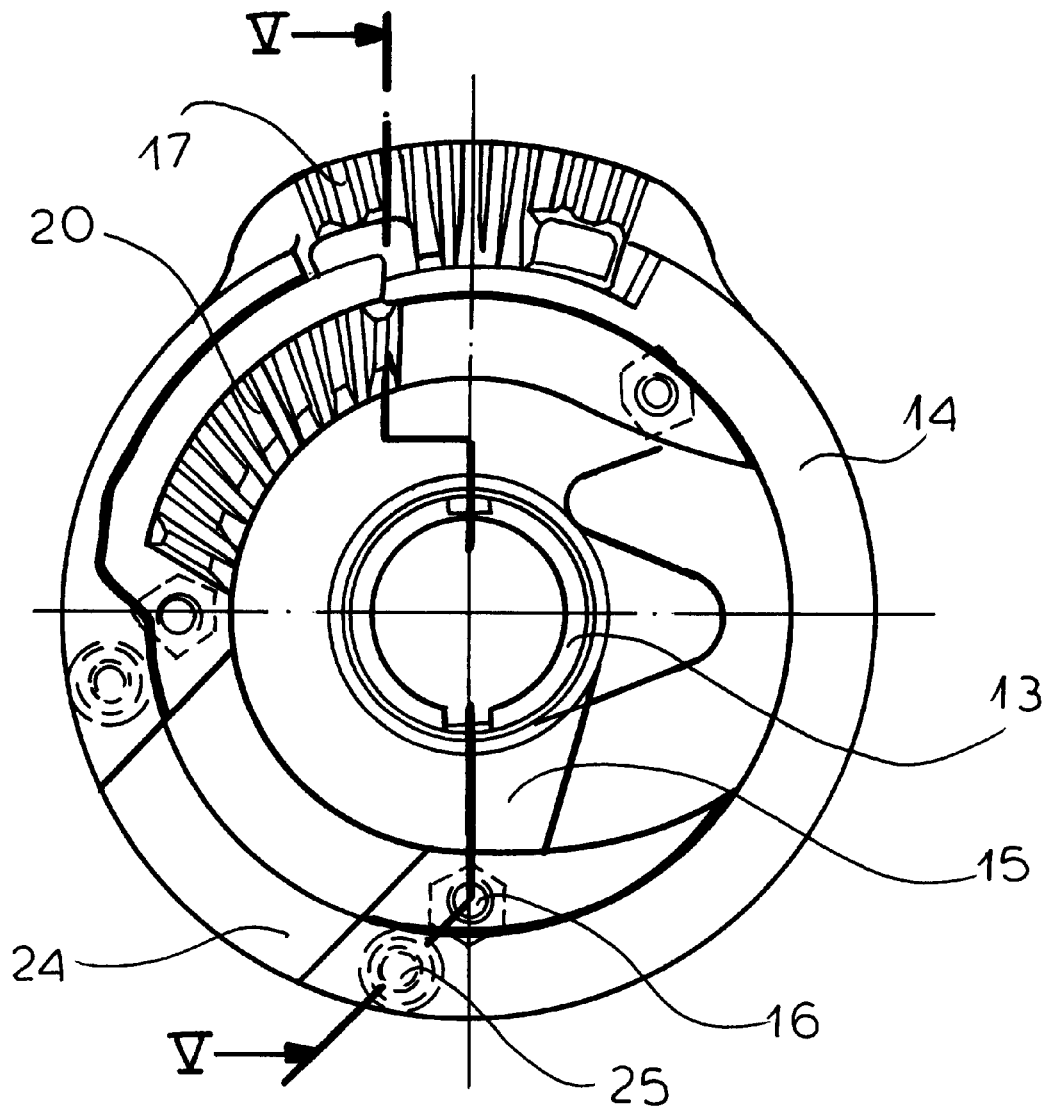
FIG. 4 is an end view of the knotter taken in the direction of arrow IV of FIG. 2.

FIGS. 2 and 3 show how one of the knotters 1 has a main disk illustrated generally at 12 and having an annularly continuous sleeve-like hub 13 fixed or keyed to the shaft 2 and a radially projecting flange 15 to which an outer rim ring 14 is secured by three angularly equispaced bolts 16. The rim ring 14 has outer gear teeth 17 that mesh with a gear 19 that drives a knotting arm 19 and inner teeth 20 that mesh with a gear 21 for the strand catcher 22, as is standard. In addition it has a cam edge 23 engageable with the gears 18 and 21 to arrest same.

The knotter 1 further has a support 26 carrying the gears 18 and 21 and parts 19 and 22. It is formed with an eye or sleeve 27 riding rotatably on the hub 13 and formed as two parts secured together by secantally extending screws 28. In addition the support 26 is braced against the housing of the baler indicated schematically in FIG. 3 at 33. A nut 29 carried on a threaded end 30 of the hub 13 bears via a disk 31 on the eye 27 and is secured in place by a retaining ring 32 to set the axial position of the support 26 relative to the disk 12.

Figure 5:
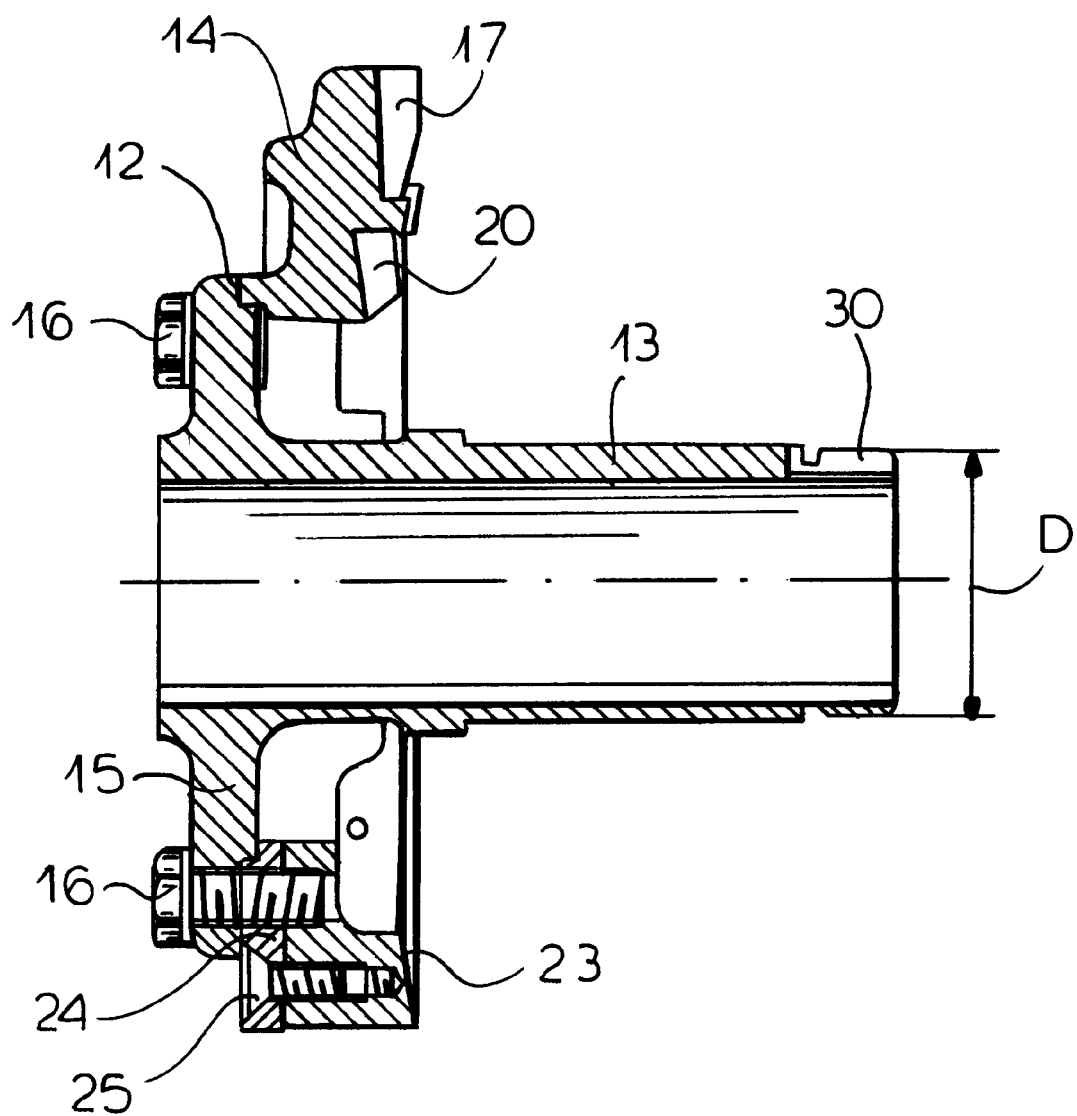
FIG. 5 is a section taken along line V—V of FIG. 4.
Figure 7:
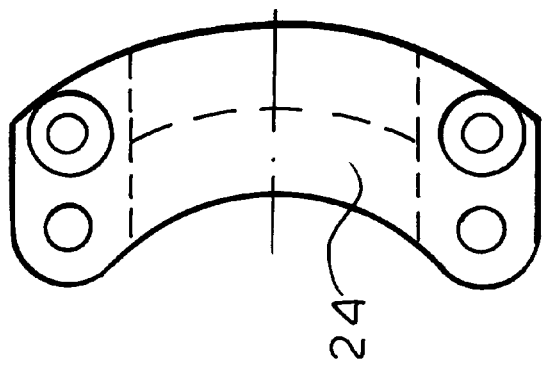
FIGS. 6 and 7 are end views of the two parts of the disk rim in accordance with the invention.
Figure 6:
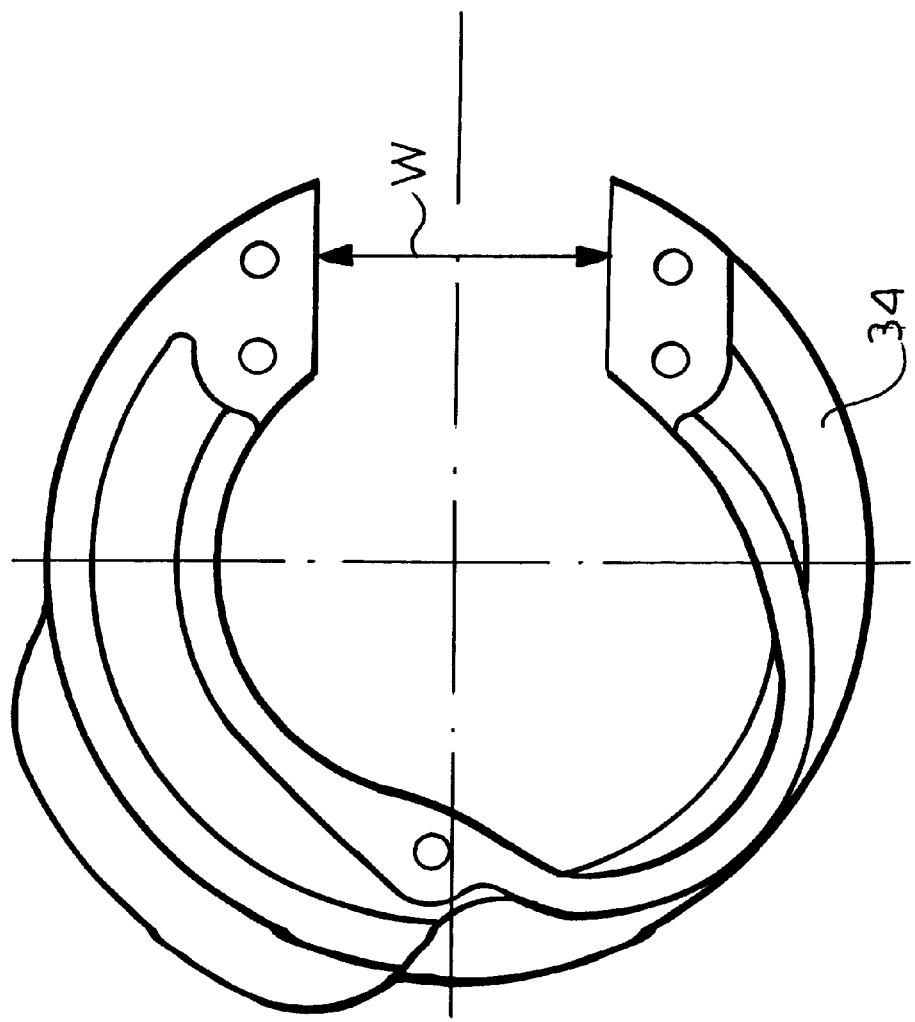

According to the invention as shown in FIGS. 6 and 7 the rim ring 14 is made up of a C-shaped main part 34 and a bridge part 24 that are secured together by two bolts 25. Two of the three bolts 16 pass through aligned holes in the two parts 24 and 34 to secure them solidly to the flange 15. The C-shaped part 34 has arms that define a gap having a width W that is slightly greater than a diameter D (FIG. 5) of the hub 13 so that when the bridge part 24 is removed, the main part 34 can be slipped over this hub 13.

Thus for replacement of the rim ring 14 the two bolts and then the two bolts 16 passing through the part 24 are removed and the part 24 is lifted off. The remaining bolt 16 is then withdrawn and the old part 34 is pulled out and a new one inserted in its place and secured there with the bolt 16. Then old part 24 or a new part 24 are set in place and secured by the remaining bolts 16 and bolts 25, restoring this wear-prone part of the knotter 1 without significant disassembly of the baler.

I claim:

1. In a baler having a frame and a shaft extending on the frame along and rotatable about an axis, a knotter comprising:

a sleeve-like hub rotationally fixed to the shaft and of a predetermined outer diameter;

a support journaled on the hub and fixed to the frame;

movable knotting parts on the support;

a rim ring surrounding the axis and formed of a main C-shaped part having arms spaced apart by a distance greater than the hub outer diameter and a bridge part between the arms and closing the main part, the rim ring having formations engageable with the parts for actuating same; and fasteners releasably fixing the rim ring on the hub.

2. The knotter defined in claim 1 wherein the formations of the rim ring are all formed on the main C-shaped part.

3. The knotter defined in claim 2 wherein the formations include a cam edge and teeth, the parts including gears engageable with the formations.

4. The knotter defined in claim 1 wherein the hub is formed with a radially projecting flange to which the rim ring is attached by the fasteners.

5. The knotter defined in claim 4 wherein the fasteners are screws.

6. The knotter defined in claim 5 wherein two of the screws engage through both the main part and the bridge part.

* * * * *